J. W. AYLSWORTH.
PROCESS OF FORMING FUSIBLE PHENOL RESINS.
APPLICATION FILED MAR. 10, 1911.
1,027,794.
Patented May 28, 1912.
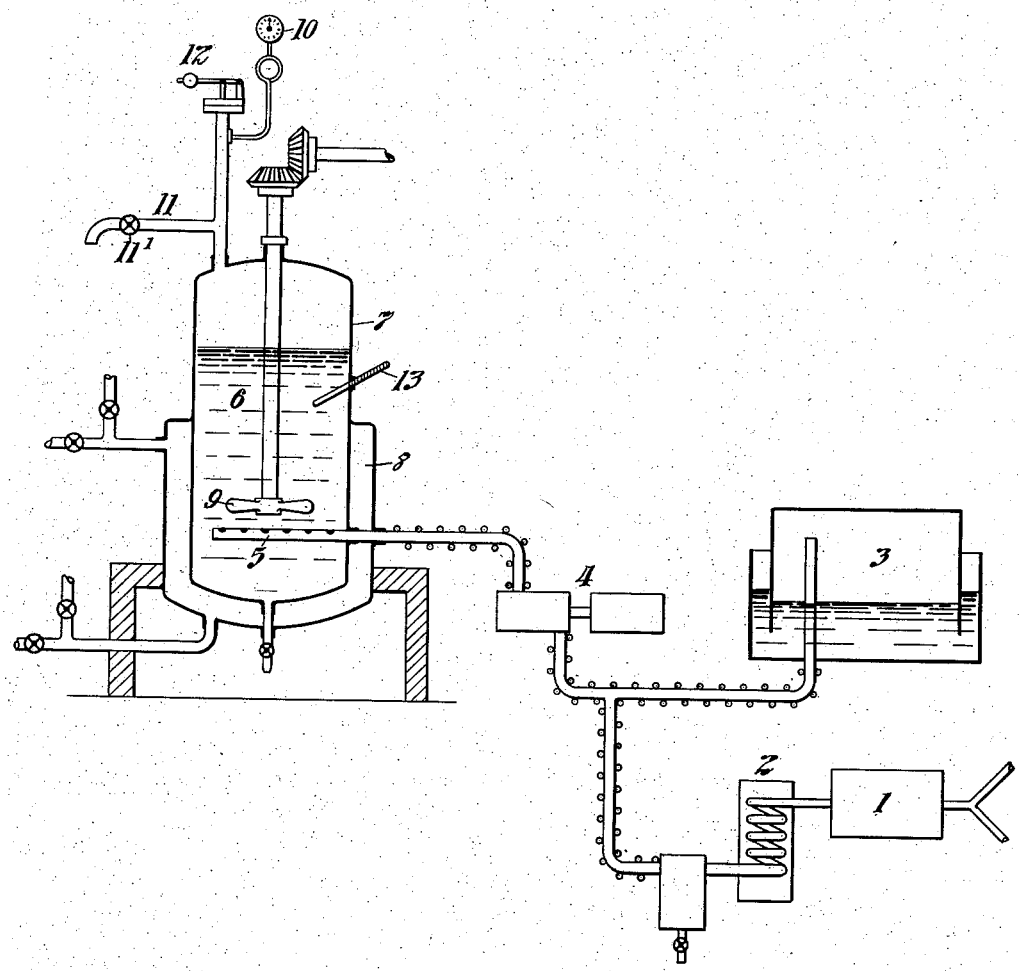

UNITED STATES PATENT OFFICE.

JONAS W. AYLSWORTH, OF EAST ORANGE, NEW JERSEY, ASSIGNOR OF ONE-HALF TO FRANK L. DYER, OF MONTCLAIR, NEW JERSEY.

PROCESS OF FORMING FUSIBLE PHENOL RESINS.

1,027,794.     Specification of Letters Patent.     Patented May 28, 1912.

Original application filed May 14, 1909, Serial No. 496,060. Divided and this application filed March 10, 1911. Serial No. 613,577.

*To all whom it may concern:*

Be it known that I, JONAS W. AYLSWORTH, a citizen of the United States, and a resident of East Orange, in the county of Essex and State of New Jersey, have invented a certain new and useful Process of Forming Fusible Phenol Resins, of which the following is a description.

My invention relates to a process of forming fusible phenol resins from phenol or cresol by condensation with formaldehyde.

This application is a division of my application Serial No. 496,060, filed May 14, 1909, entitled "Composition and process of manufacturing the same."

The application above referred to relates to the formation of a synthetic resin, which is a hard fusible resin formed by the condensation of a phenol with formaldehyde, and also the formation of an ultimate infusible phenolic condensation product which is insoluble and very hard. This infusible product may be formed as described in the said application by reaction between the fusible phenol resin and an added amount of formaldehyde. In the said application, several methods are described for forming the fusible condensation product or phenolic resin. My present application concerns itself only with the second method described in my application above referred to for forming the phenol resin, and also a combination of the first and second methods for forming the phenol resin, as described in the parent application.

The object of my invention is to produce a fusible phenolic condensation product by the process to be described.

In order that my invention may be more clearly understood, attention is hereby directed to the accompanying drawing forming part of this specification and illustrating diagrammatically one form of apparatus wherein may be carried out in one of its forms, my improved method for forming the phenol resin referred to.

With the first method of forming the fusible phenol resin described in my application above referred to, phenol or cresol is heated in an autoclave to a temperature of from 260 to 340 degrees F. and maintained at such temperature. Formaldehyde gas is forced by suitable pumps into the bottom of the autoclave, where it is distributed by means of a finely perforated coil into a multitude of bubbles which pass upward through the phenol and are absorbed therein and combined therewith. A pressure in slight excess of the vapor tension of the contents of the autoclave is maintained in the autoclave by means of feeding compressed formaldehyde gas therein as rapidly as it combines with the phenol. The supply of formaldehyde is continued until a sample withdrawn for test shows only the desired small percentage of free or unchanged phenol. A test may be made, as is well understood, by obtaining the "bromin number" of the composition, and the percentage of free phenol, as indicated by the bromin number, may vary from a very small amount up to 12 per cent. The supply of gas is then stopped and a vent in the autoclave is opened for the escape of steam which is regulated by a suitable valve. The contents of the chamber are then heated to complete dehydration which requires about 400 degrees F. of heat. The contents are then cooled to about 240 degrees F. and cast in ingots for subsequent use or passed into suitable mixing vessels for immediate use.

Referring to the drawing illustrating a means for practising the first method of forming phenol resin described, formaldehyde is generated in the generator 1, and passes through condenser 2, which removes unchanged methyl-alcohol therefrom, to the gasometer 3, which is provided with an oil seal and is adapted to be steam heated. Formaldehyde gas is taken therefrom as desired, by pump 4 and allowed to pass as bubbles from perforated pipe 5 into the liquid phenol 6 in the autoclave 7 which is provided with steam jacket 8, agitator 9, pressure gage 10, vent 11 for the escape of steam when necessary, which is regulated by a valve 11', and safety valve 12. Provision should be made for steam heating the pipes through which the formaldehyde passes, and for passing cooling water through steam jacket 8 when the reaction has started to prevent the temperature from rising above the proper reaction temperature. This can be regulated by thermometer 13.

In the second of the methods referred to in the parent application, which will be claimed herein, phenol and a 40% solution of formaldehyde, together with a small percentage of either an acid or a basic acceleration or catalytic agent, are treated and allowed to interact to form rapidly the ultimate condensation product of the phenol and the formaldehyde in the form of an infusible porous mass. This mass will be porous because of the evolution of gaseous products, which as is well known, takes place when the reaction between the phenol and formaldehyde is allowed to rapidly ensue at an elevated temperature and under no counteracting pressure. In this case, however, this is of no moment, because of the subsequent treatment of the mass. This infusible mass is preferably crushed and pulverized and then baked at approximately 350 degrees F., whereby entrapped water and acid vapors are expelled. The powdered and dried substance is mixed with phenol or cresol in approximately the proportion of two parts of the final condensation product to one part of the phenol, and heated in a closed vessel under its own pressure to a temperature of from 450 to 550 degrees F., for several hours. By this treatment, the ingredients of the mass go into the solution with a chemical change, whereby the product reverts or is broken down to the fusible resin, presumably by reduction of the formaldehyde element in the combination. By this means after the distillation of the excess unchanged phenol, a resin is formed similar to that described in the process described as the first method in my application above referred to.

In method 2, just described, the ultimate condensation product is entirely converted into phenol resin, there being an excess of phenol, as stated, after the formation of the resin, which may be distilled off. Instead of distilling off this excess phenol, however, compressed formaldehyde gas may be forced into the solution, after the ultimate product has been broken down to phenol resin, and caused to combine with the excess phenol, as in the first process, to form more phenol resin, the gas being forced into the solution as fast as it combines with the excess phenol, and this continued, as in the first described process, until a test sample shows the desired small percentage of uncombined phenol. As noted above, under the second method, acid or basic condensing agents apparently must be used in small percentages in the formation of the ultimate infusible product which is to be broken down to the fusible condensation product or phenol resin, since infusible phenolic condensation products formed without such agents do not readily dissolve in the phenol except at much higher temperature.

It is especially advantageous to combine methods 1 and 2, as just described, because thereby a manufacturer is enabled to use scrap material and discarded and imperfect articles. Phenol and cresol are the preferred solvents for the ultimate condensation product, but other solvents may be used, such as a mixture of phenol and naphthalene, the naphthalene in this case being removed by distillation after the solution is formed, if desired. In this method the naphthalene is used to dilute the solvent mixture, and to obviate the necessity of using as much free phenol as would otherwise be necessary.

The phenol resin obtained by any of the methods described after complete dehydration and removal of excess phenol is a hard resin, very similar in texture to copal and kauri gum. It is soluble in all proportions in acetone, amyl, ethyl, methyl and butyl alcohol, amyl, ethyl and methyl acetate, acetic acid, acetylene tetra-chlorid, and mono-nitro-benzene, (oil of mirbane), which it remains unchanged after evaporation of the solvents. It is fusible and practically unchanged when heated to 420 degrees F. It melts at about 220 degrees F., but has no sharp melting point, passing through various degrees of viscosity, until at 250 degrees F. it may readily be poured and at 350 degrees F. it becomes quite thinly fluid. It acts as a weak acid toward bases with which it combines. It is soluble in shellac, resin and similar substances when fused therewith. This resin will not form the hard infusible condensation product described by Smith, Story, Baekeland and others, (see English Patents 16,247 of 1899, to Smith, 8875 of 1905, to Story, U. S. Patents 942,699 to Baekeland, and 735,278, to Luft, and an article by W. Kleeberg, in the German publication "*Annalen der Chemie*", Liebig, vol. 263, page 283, 1891), when heated with basic or acid condensing agents, or alone, at any temperature. When mixed with formaldehyde, paraformaldehyde, or trioxymethylene, and heated, it combines therewith and forms a hard infusible mass, which, if not admixed with other bodies, remains transparent and chemically inert, and is insoluble in water and in the following solvents, alcohol, (ethyl, methyl, amyl or butylic), ether, chloroform, carbon bisulfid, carbon tetra-chlorid, acetylene tetra-chlorid, acetone, benzol, camphor oil, turpentine, melted waxes, petroleum, and mineral and vegetable oils. It will not, however, form such hard infusible mass when mixed with aldehydes in general, other than those mentioned, and if the percentage of formaldehyde or its polymers exceed 7½ per cent., the excess escapes as bubbles in the mass and renders the latter useless for some purposes.

In addition to methods 1 and 2 and the combination thereof previously described for forming phenol resin, I may, as stated in my application above referred to, use a 35% solution of formaldehyde in the proportion of 1000 parts of phenol to 750 parts of formaldehyde by weight, and heat the mass to a temperature of from 300 degrees to 320 degrees F. under its own pressure, without any agent. If a 40% solution of formaldehyde is used, the proportions should be about 650 parts of formaldehyde to 1000 parts of phenol. In the above proportions, formaldehyde solutions are given as volume percentages. The weight percentage of the formaldehyde in the solution is approximately 5% less. The proportions of formaldehyde solution given in the formulas are slightly more than the required amount to allow for losses during the process. In this method as in method No. 1 above described, care must be taken to avoid the presence of any impurity which will act as an accelerator or catalytic agent, otherwise difficultly fusible and very viscid products will result. For instance, if the operation is carried out in an iron vessel, care must be taken to have the iron well enameled or lined with a metal which will not modify the product. Iron and lead so modify the product as to render the latter unfit. If crude phenol or cresol are used, they should first be refined by distillation to eliminate basic metallic impurities as well as mineral acids. In process No. 2 above described, for making phenol resin, when naphthalene and phenol are used as a solvent for the ultimate condensation product to be transformed or broken down into the phenol resin, the phenol must be added in the proportion of about 20% of the condensation product and the naphthalene in about the proportion of from 50% to 100% of the condensation product.

The synthetic resin formed by this process may be used for varnish gums, for baking enamels and japans, as solid solvents for pyroxylin, and cellulose acetate and the like. Also, as stated, it may be used as an ingredient in the formation of an infusible insoluble phenolic condensation product in the process described in my above mentioned application. Also by the process herein particularly described, a manufacturer of articles formed from such an infusible insoluble phenolic condensation product as described, may make use of scrap material and discarded and imperfect articles, by causing the same to be transformed into a fusible product as described herein, which fusible products may then be again utilized in the process for making the infusible product.

The synthetic resin formed by my process as described herein is fusible and soluble in many solvents as above stated and contains phenol and formaldehyde combined in such proportions that the phenol is almost entirely combined with the formaldehyde, and there is no excess or free or uncombined formaldehyde.

Having now described my invention, what I claim and desire to protect by Letters Patent is as follows:—

1. The process of forming a hard fusible phenol resin, consisting in causing a reaction to take place between a phenol and formaldehyde with a small proportion of a condensing agent, with application of heat, to form a final infusible condensation product, crushing the latter, heating to expel entrapped water and other vapors, mixing with a suitable amount of phenol or equivalent, and applying sufficient heat in a closed vessel to dissolve the condensation product therein, and maintaining the heat for a sufficient time to reduce the product to the desired fusible phenol resin, and distil off the free or unchanged phenol, substantially as described.

2. The process of forming a hard fusible phenol resin, consisting in forming a final infusible condensation product of a phenol and formaldehyde or equivalent thereof, and causing the said product to dissolve in an added amount of a phenol, causing the said product to break down to a fusible phenol resin by combination with some of the said added phenol and distilling off the excess phenol, substantially as described.

3. The process of forming a hard fusible phenol resin, consisting in forming a final infusible condensation product of a phenol and formaldehyde, causing the said product to dissolve in an added amount of a phenol, and causing the said product to break down to a fusible phenol resin by combination with some of the said added phenol, substantially as described.

4. The process of forming a hard fusible phenol resin, consisting in pulverizing an infusible final phenolic condensation product, mixing the same with a phenol in approximately the proportion of two parts of the final product to one part of the phenol, and heating the mixture sufficiently to cause the said final product to break down to a fusible phenol resin by combination with some of the phenol, substantially as described.

5. The process of forming a hard fusible phenol resin, consisting in pulverizing an infusible final phenolic condensation product, mixing the same with a substance which may act as a solvent therefor at elevated temperatures, and which comprises a phenol, and heating the mixture to a temperature of over 450° F. in a closed vessel, until a phenol resin is formed by reaction between the said infusible condensation product and some of the said phenol, substantially as described.

This specification signed and witnessed this 3d day of March, 1911.

JONAS W. AYLSWORTH.

Witnesses:
 DYER SMITH,
 ANNA R. KLEHM.